United States Patent [19]
Yamada et al.

[11] Patent Number: 5,933,286
[45] Date of Patent: Aug. 3, 1999

[54] IMAGE FORMING LENS

[75] Inventors: Hiroshi Yamada, Omiya; Akiko Nagahara, Koshigaya, both of Japan

[73] Assignee: Fuji Photo Optical Co., Ltd., Omiya, Japan

[21] Appl. No.: 08/897,766

[22] Filed: Jul. 21, 1997

[30] Foreign Application Priority Data

Jul. 22, 1996 [JP] Japan .................................. 8-211982

[51] Int. Cl.$^6$ ...................................................... G02B 9/60

[52] U.S. Cl. ........................... 359/770; 359/753; 359/763

[58] Field of Search ..................................... 359/749–753, 359/755, 762, 763, 770

[56] References Cited

U.S. PATENT DOCUMENTS

| | | | |
|---|---|---|---|
| 3,277,784 | 10/1966 | Hudson | 359/755 |
| 4,525,038 | 6/1985 | Muller | 359/753 |
| 5,153,779 | 10/1992 | Ohashi | 359/770 |
| 5,321,551 | 6/1994 | Choi | 359/770 |

*Primary Examiner*—Loha Ben
*Attorney, Agent, or Firm*—Arnold International; Bruce Y. Arnold

[57] ABSTRACT

An image-forming lens made of five lens elements having refractive power, from the object side, of negative, negative, positive, positive, and negative. The distance between the image side of the surfaces of second and third lens elements is made greater than or equal to 3.4 f, and less than or equal to 7.5 f, where f is the focal length of the image-forming lens, so as to minimize spherical aberration, coma, and astigmatism. The image-forming lens thus formed is a retro-focus lens having a half-picture angle of about 80° and an F# of about 1.8.

9 Claims, 13 Drawing Sheets

IMAGE FORMING LENS

BACKGROUND OF THE INVENTION

The present invention relates to an image-forming lens formed from lens elements having spherical or planar surfaces and, in particular, relates to an image-forming lens to be used as a photographic lens with TV telephones, door phones, video cameras or digital cameras.

In recent years great use has been made of solid state photographic image elements (e.g., CCD arrays) with video cameras or digital cameras. In the course of technological progress, solid state photographic image elements have come to be miniaturized over the years, and at the same time, through miniaturization in photographic lenses, greater use has been made of wide angle lenses.

On the other hand, with both video cameras and digital cameras, there has been a trend of increasing use of low pass filters to prevent moire effects, infra-red light shielding filters to correct spectral sensitivity of the solid state photographic image elements, and glass covers to protect the surface of the solid state photographic image elements. In such instances, it has been necessary to increase the back focal length Bf (hereinafter referred to as simply the back focus) of the photographic lens to some extent in order to provide adequate space between the photographic lens and the solid state photographic image elements.

Japanese Patent Publication No. 5-264895 discloses an image-forming lens which employs four lens elements having spherical or planar surfaces. And, U.S. Pat. No. 4,525,038 discloses an image-forming lens which employs five lens elements having spherical or planar surfaces. However, in these instances the picture angle is a relatively small 90 degrees. And, in the case of the latter patent, the F# is greater than 4.0, resulting in an extremely dark image.

BRIEF SUMMARY OF THE INVENTION

A first object of the present invention is to provide a miniaturized lens in which the picture angle is 150 degrees or greater, the F# is 1.8 or less, and wherein the back focus provides adequate space between the photographic lens and the solid state photographic image elements to accommodate a low pass filter to prevent moire, an infra-red light shielding filter to correct spectral content, or a glass cover to protect the photographic image surface.

A second object of the present invention is to provide an image-forming lens having five lens elements, with the distance from the image-side surface of the second lens element to the image-side surface of the third lens element being less then a specified length. This enables the back focus to be made long. Furthermore, the F# can also be made as low as 1.8 so as to yield a bright image, and the half-picture angle ω can also be made to be a wide degree of angularity of approximately 80 degrees. In such a design, it is possible for superior image resolving power and miniaturization to be achieved, thereby achieving an appropriate lens quality to serve as a photographic lens with TV telephones, door phones, video cameras or digital cameras.

In addition, with the image-forming lens of the present invention, a diaphragm is preferably arranged more to the image side than the object-side surface of the fourth lens element. Furthermore, with the image-forming lens referred to above, the Abbe number $\upsilon_5$ of the fifth lens element is made to be less than 40.

BRIEF DESCRIPTION OF THE DRAWINGS

The present invention will become more fully understood from the detailed description given below and the accompanying drawings. The various embodiments of the invention are given by way of illustration only, and thus, are not limitative of the present invention wherein.

DETAILED DESCRIPTION

An explanation of various embodiments of the present invention is described below, with reference to the drawings.

Figure 1:
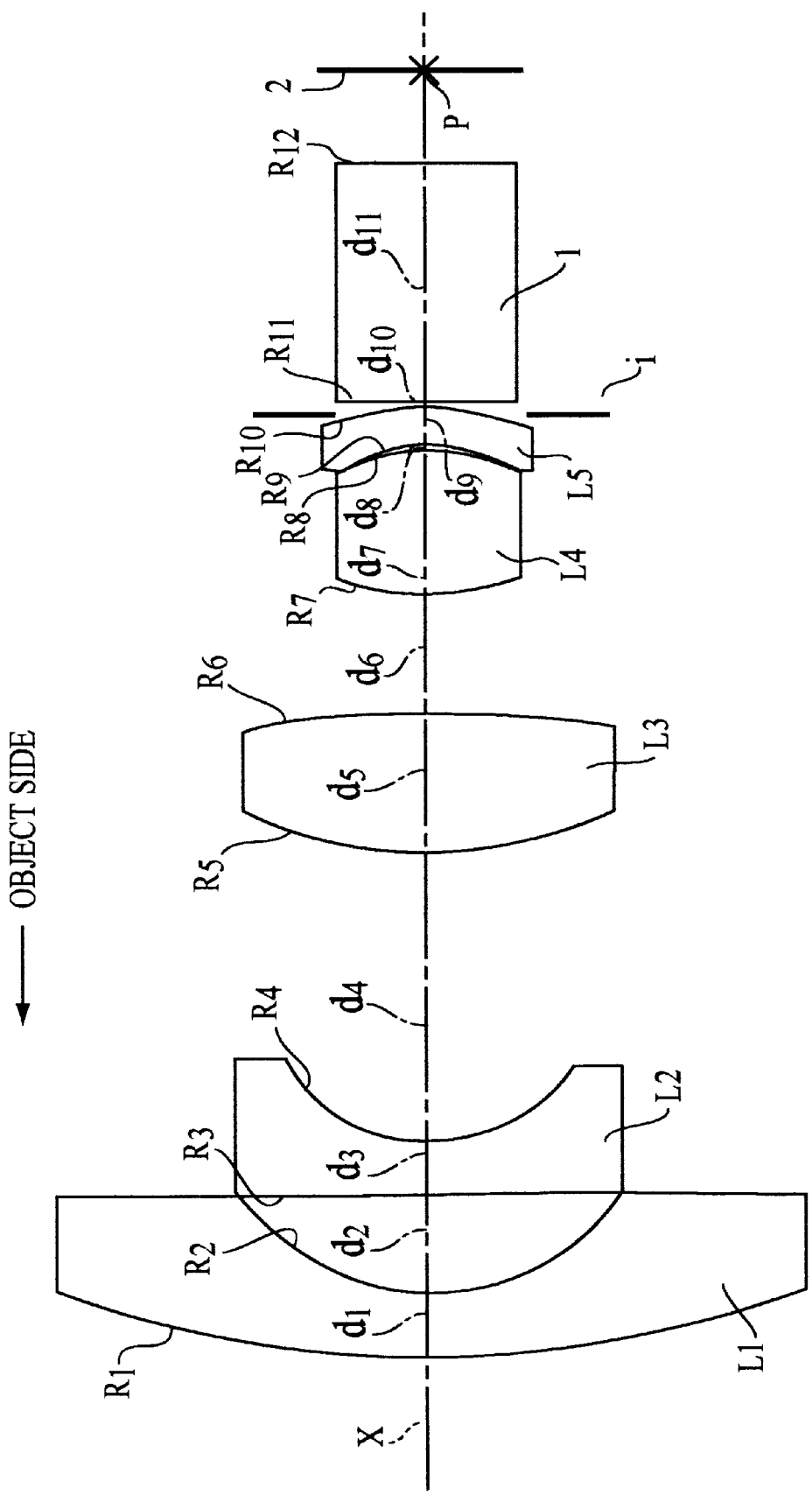
FIG. 1 is a summary diagram which shows the basic construtction of the lens of the present invention according to embodiments 1–6 of the present invention.
Figure 2:
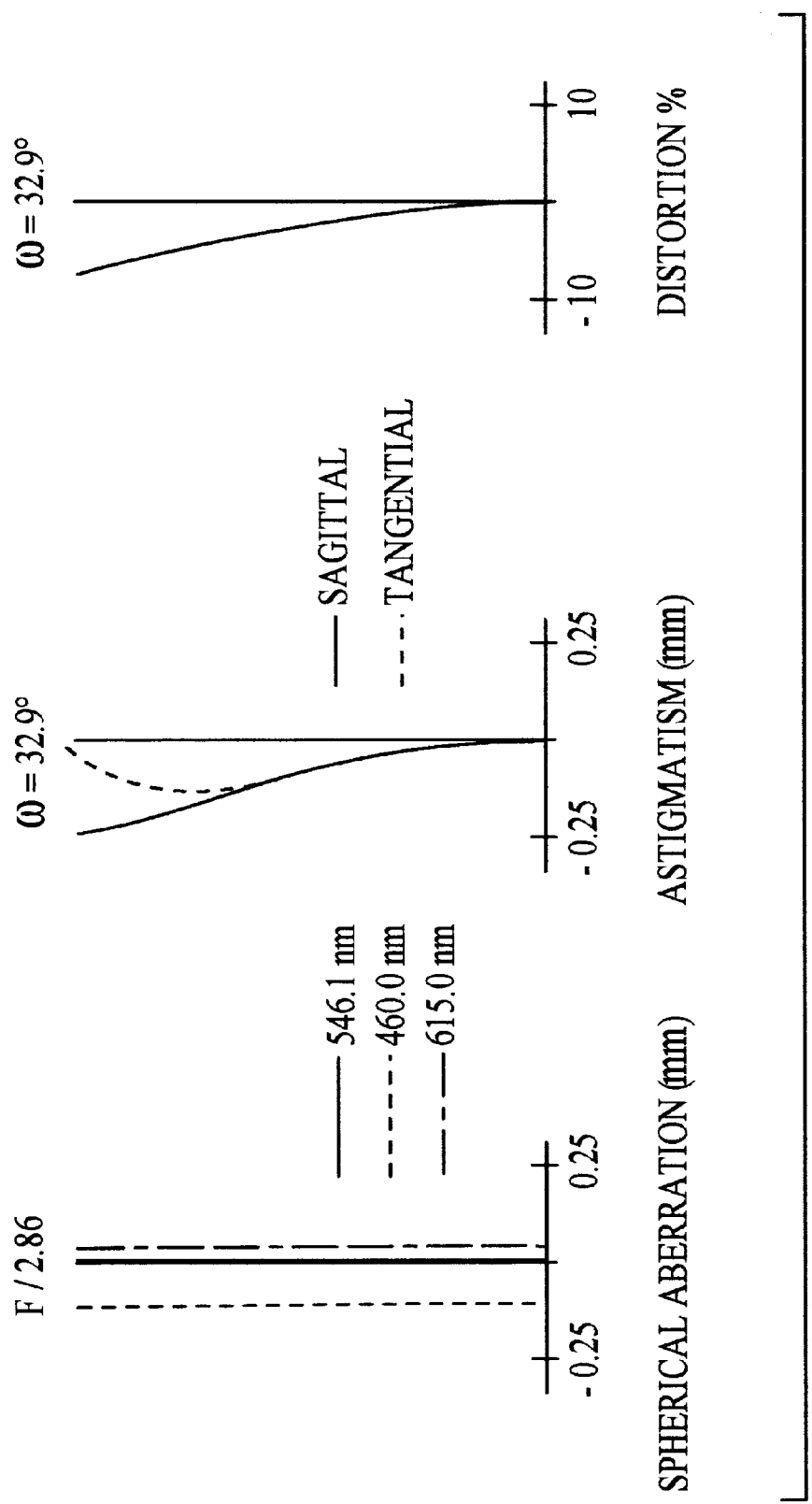
FIG. 2 is a diagram of the spherical aberration, astigmatism, and distortion of the lens of embodiment 1.
Figure 3:
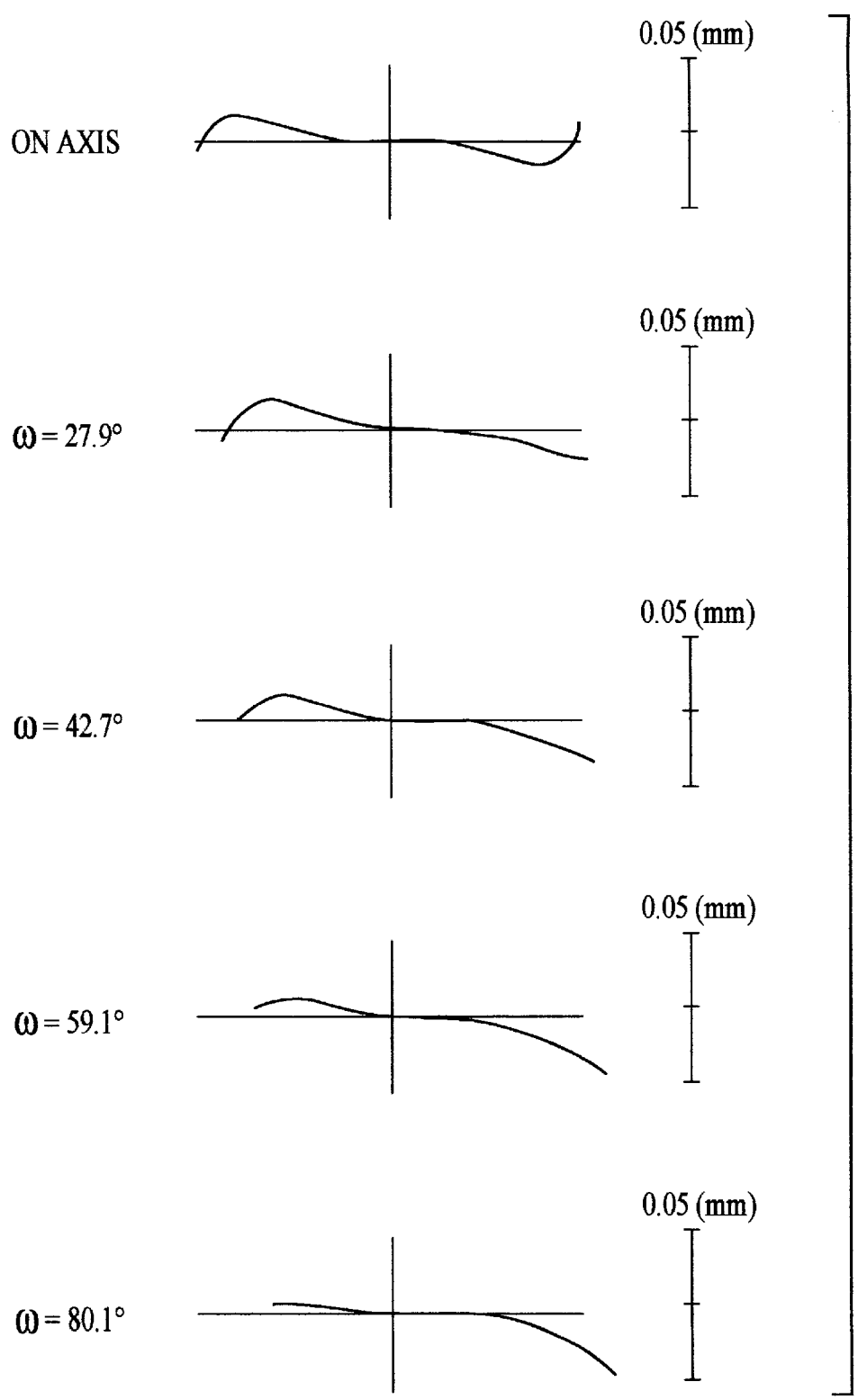
FIG. 3 shows the coma of the lens of embodiment 1.
Figure 4:
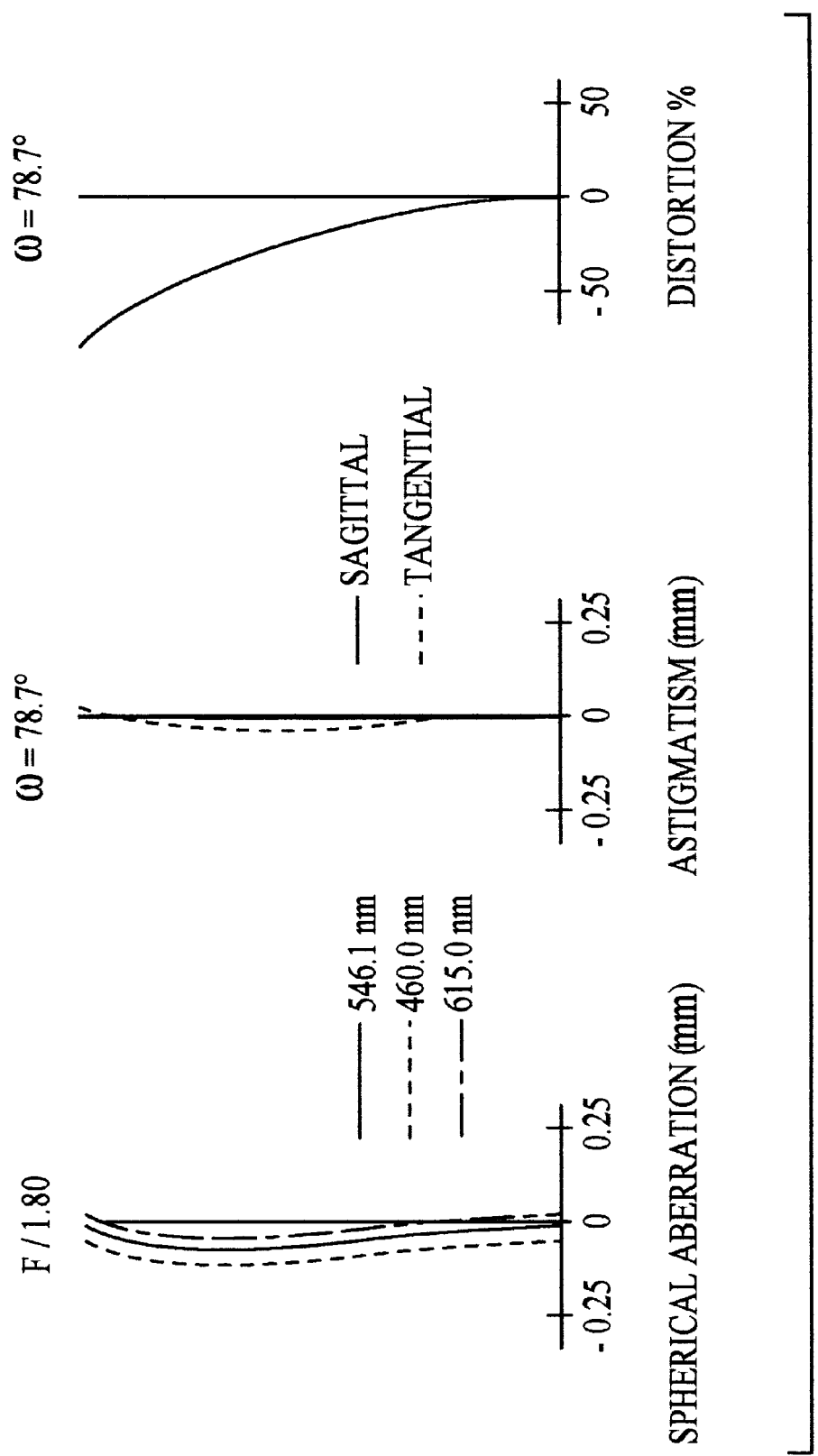
FIG. 4 is a diagram of the spherical aberration, astigmatism, and distortion of the lens of embodiment 2.
Figure 5:
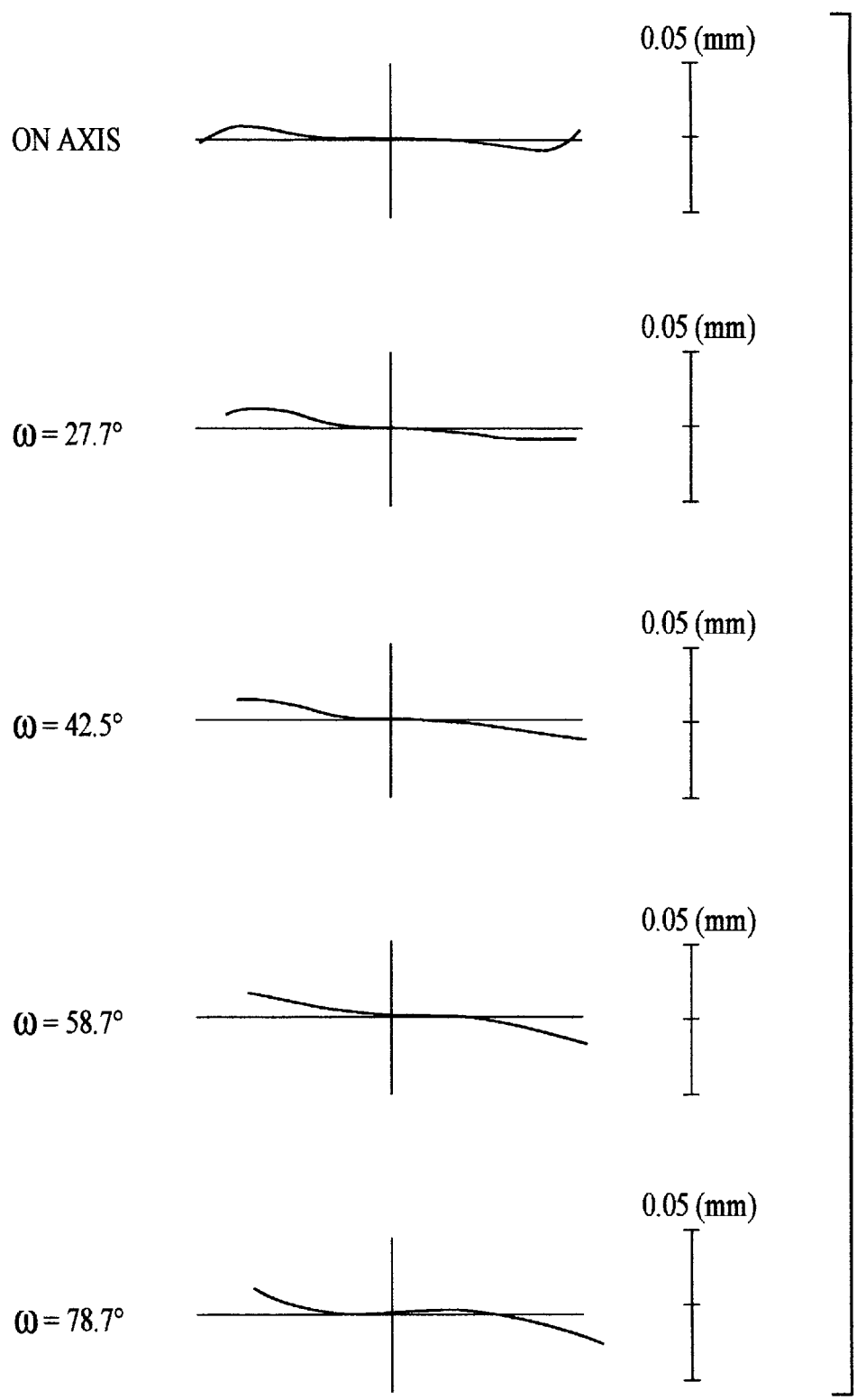
FIG. 5 shows the coma of the lens of embodiment 2.
Figure 6:
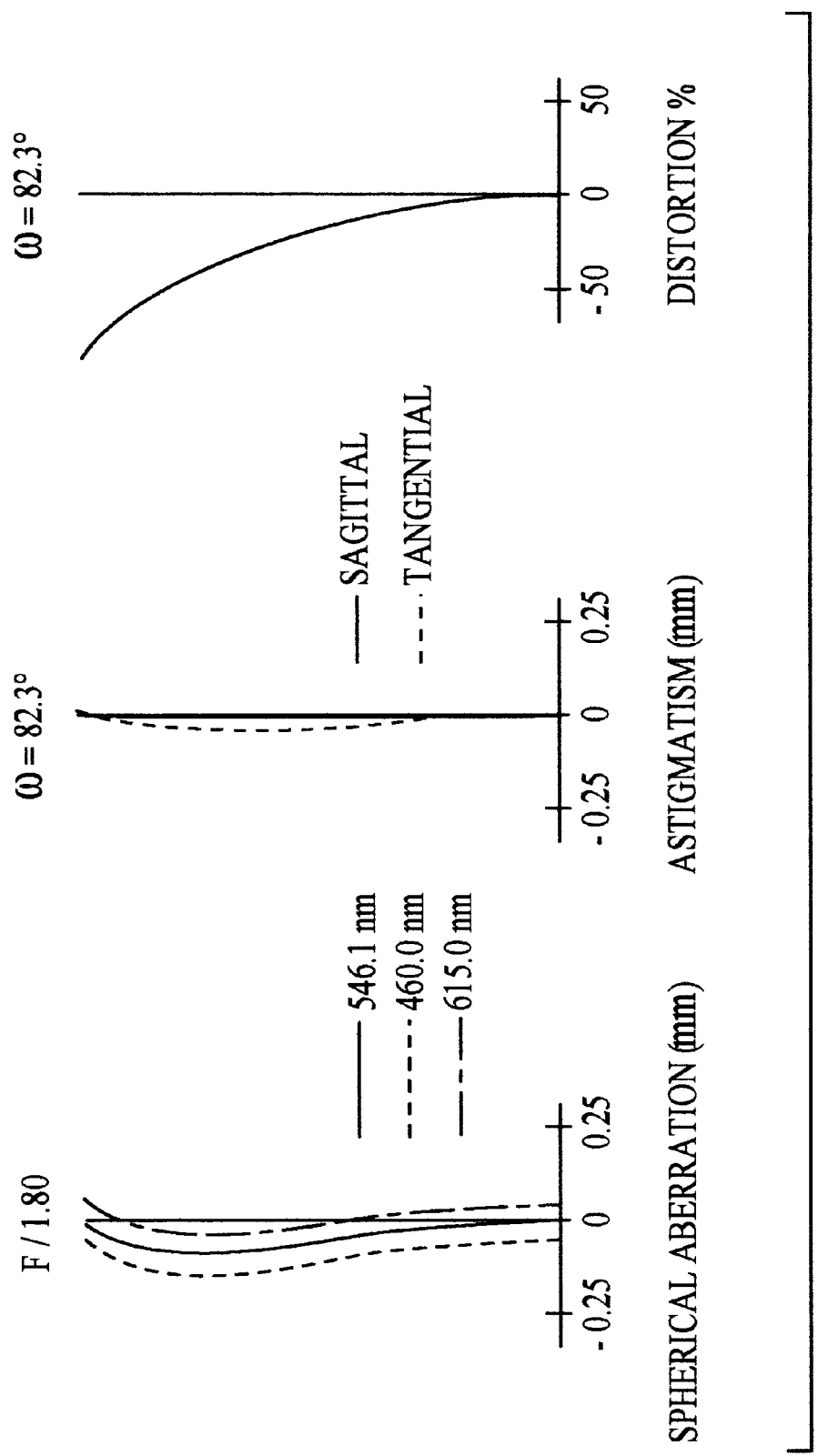
FIG. 6 is a diagram of the spherical aberration, astigmatism, and distortion of the lens of embodiment 3.
Figure 7:
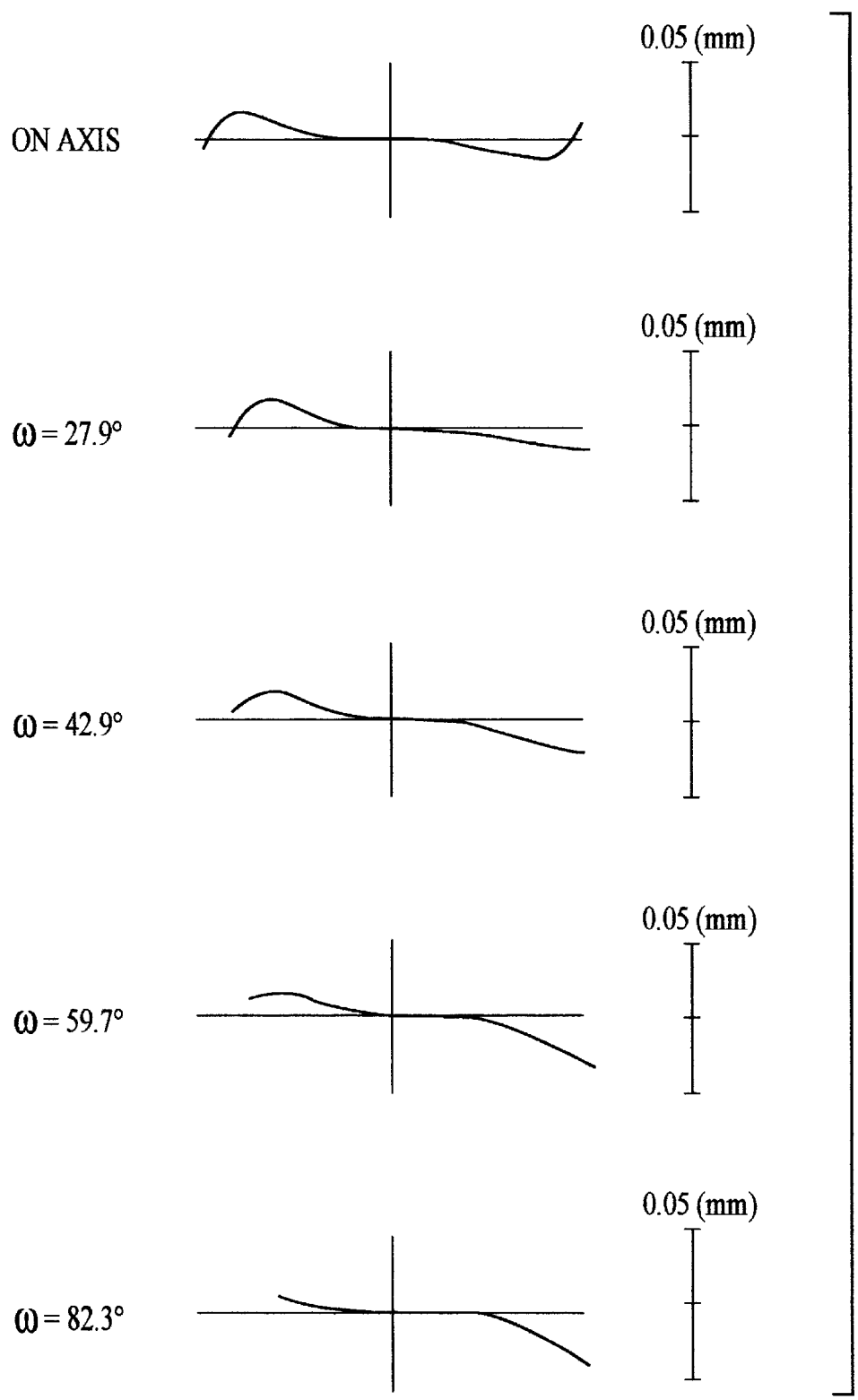
FIG. 7 shows the coma of the lens of embodiment 3.
Figure 8:
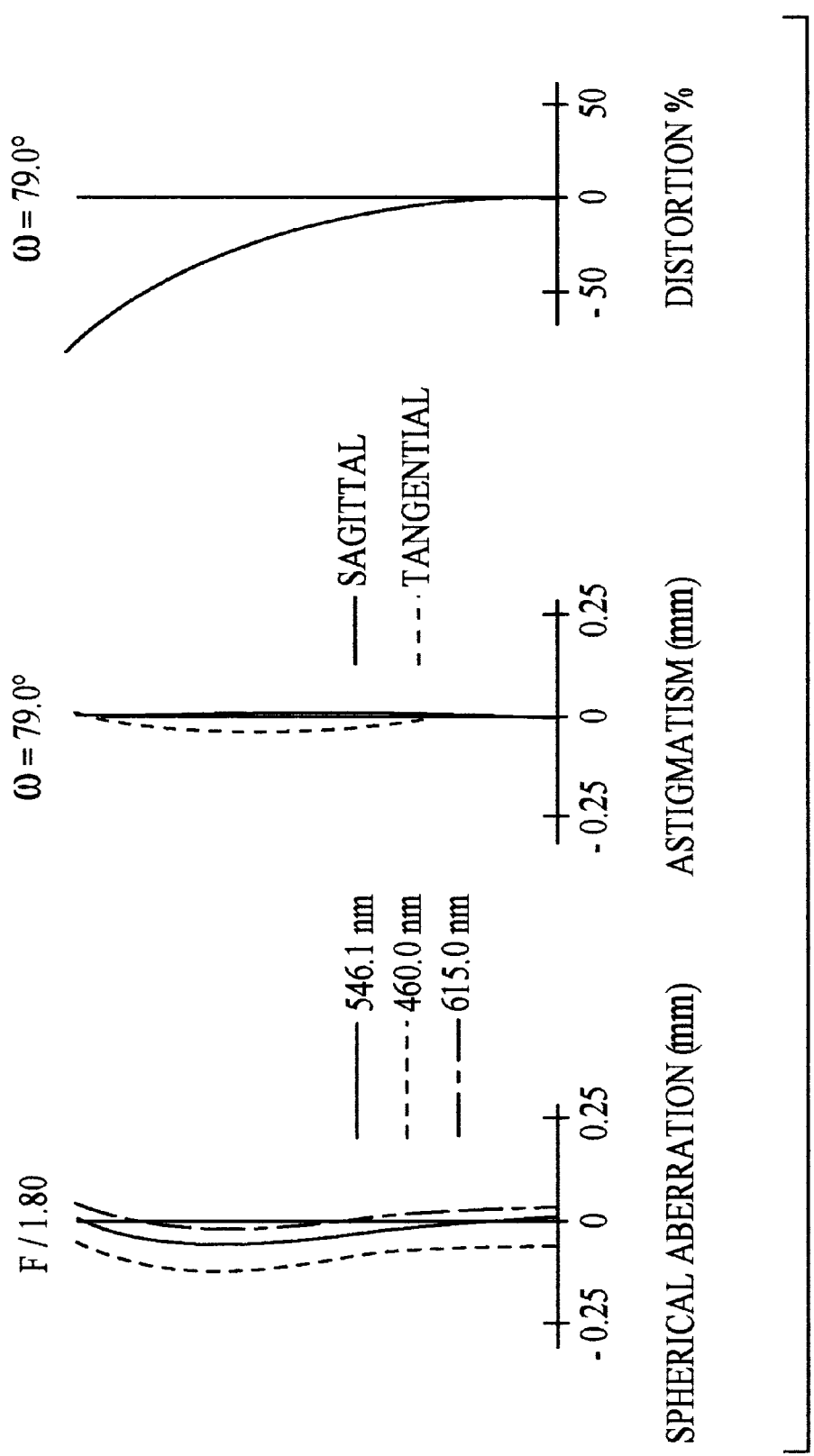
FIG. 8 is a diagram of the spherical aberration, astigmatism, and distortion of the lens of embodiment 4.
Figure 9:
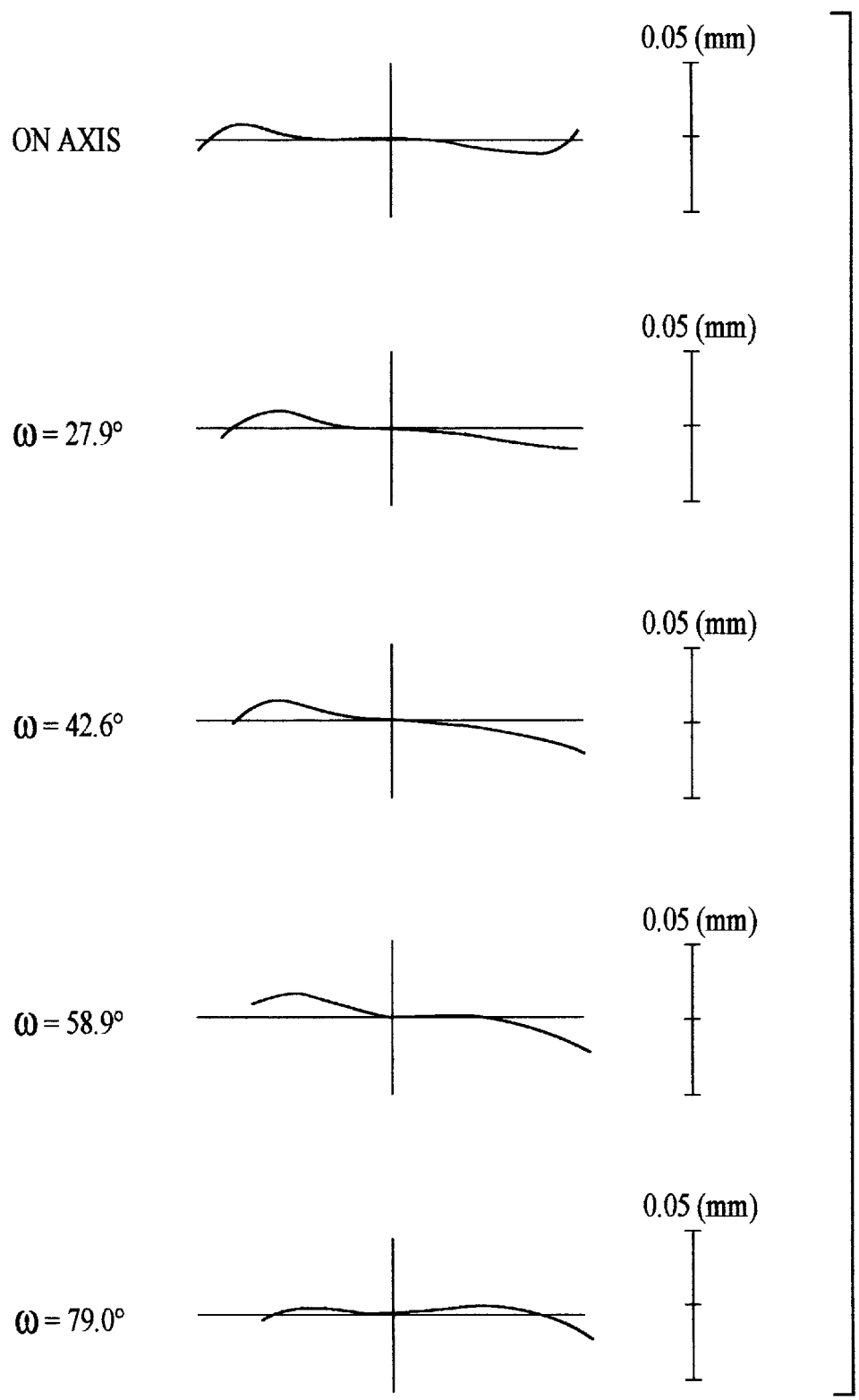
FIG. 9 shows the coma of the lens of embodiment 4.
Figure 10:
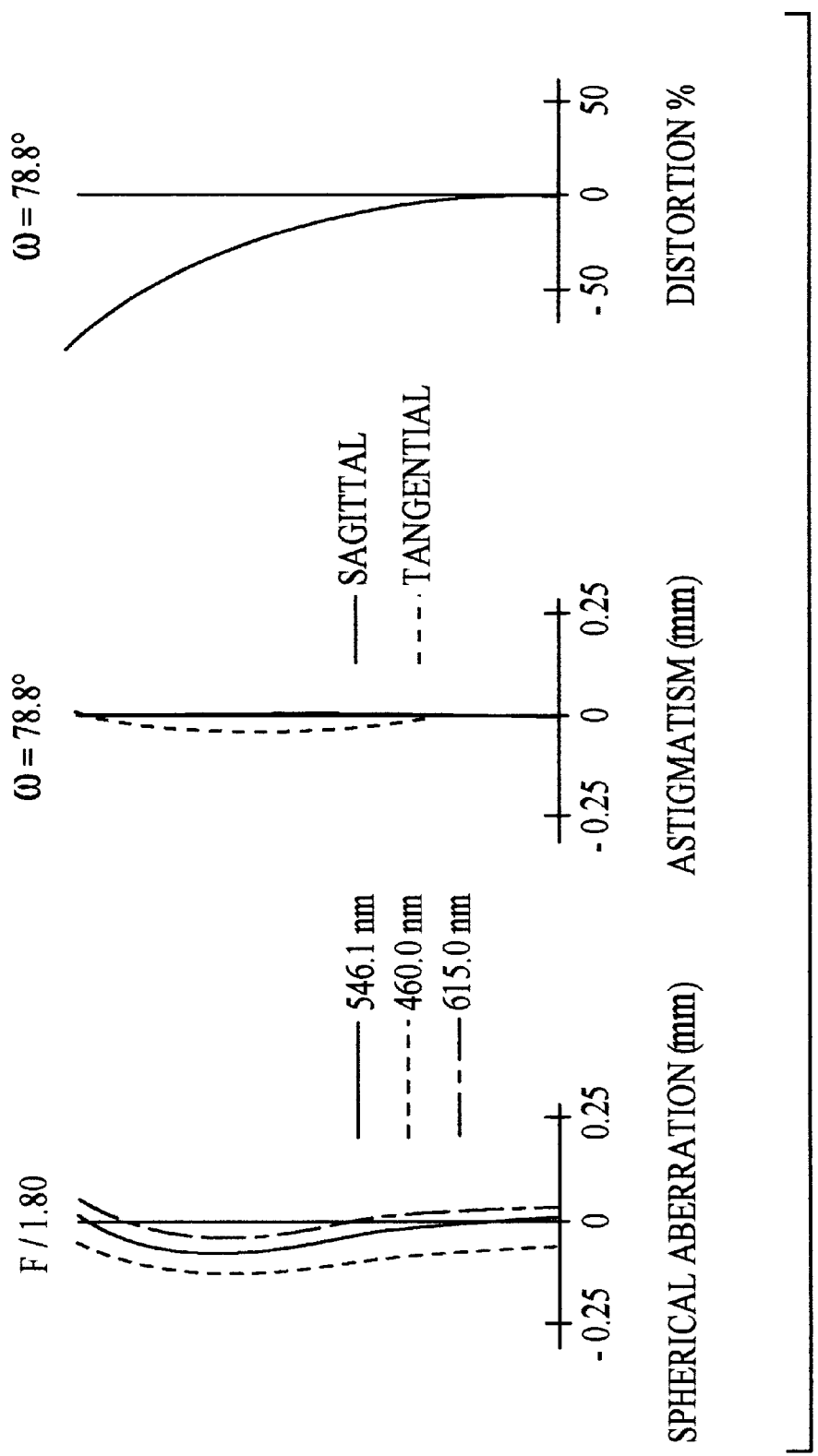
FIG. 10 is a diagram of the spherical aberration, astigmatism, and distortion of the lens of embodiment 5.
Figure 11:
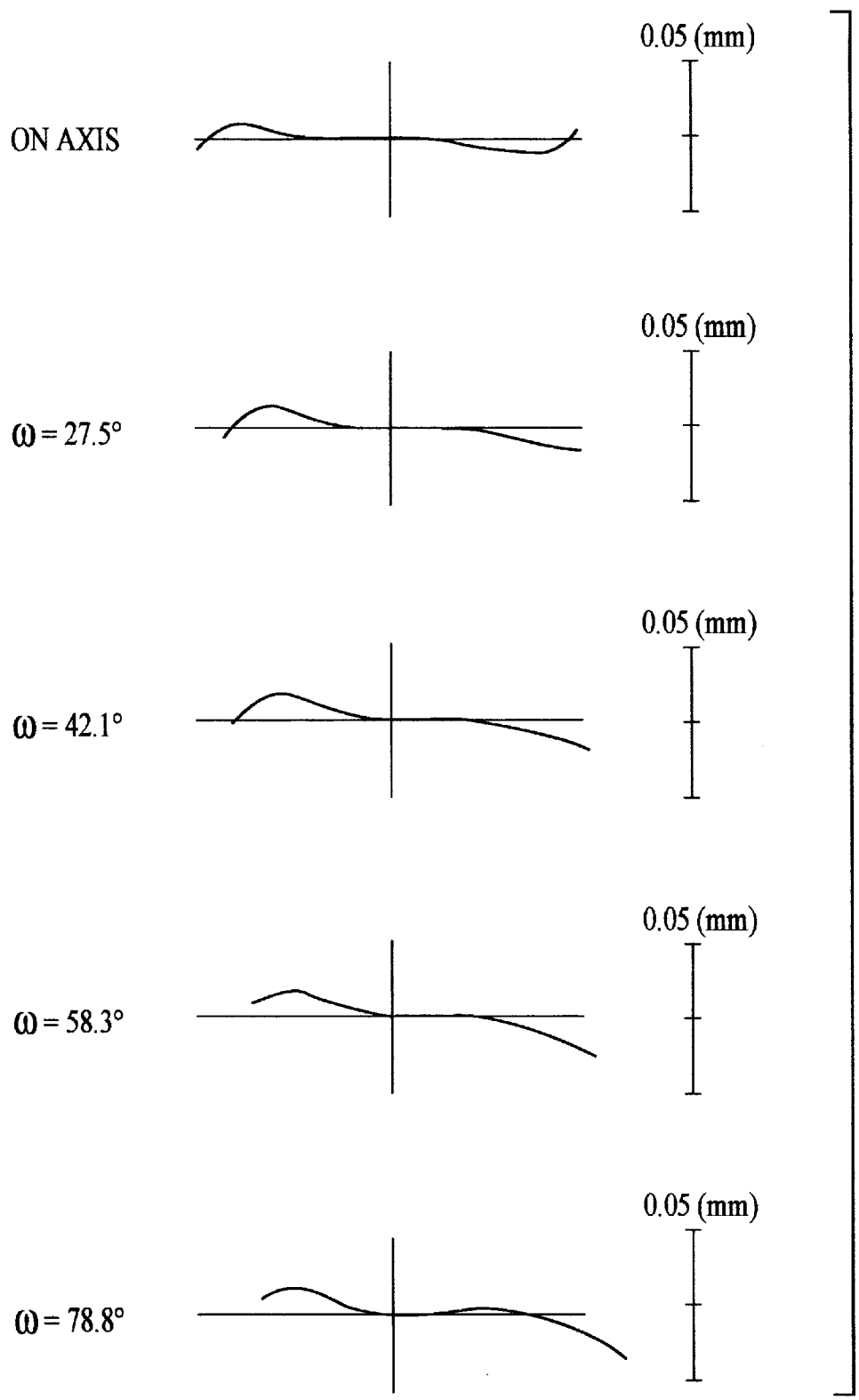
FIG. 11 shows the coma of the lens of embodiment 5.
Figure 12:
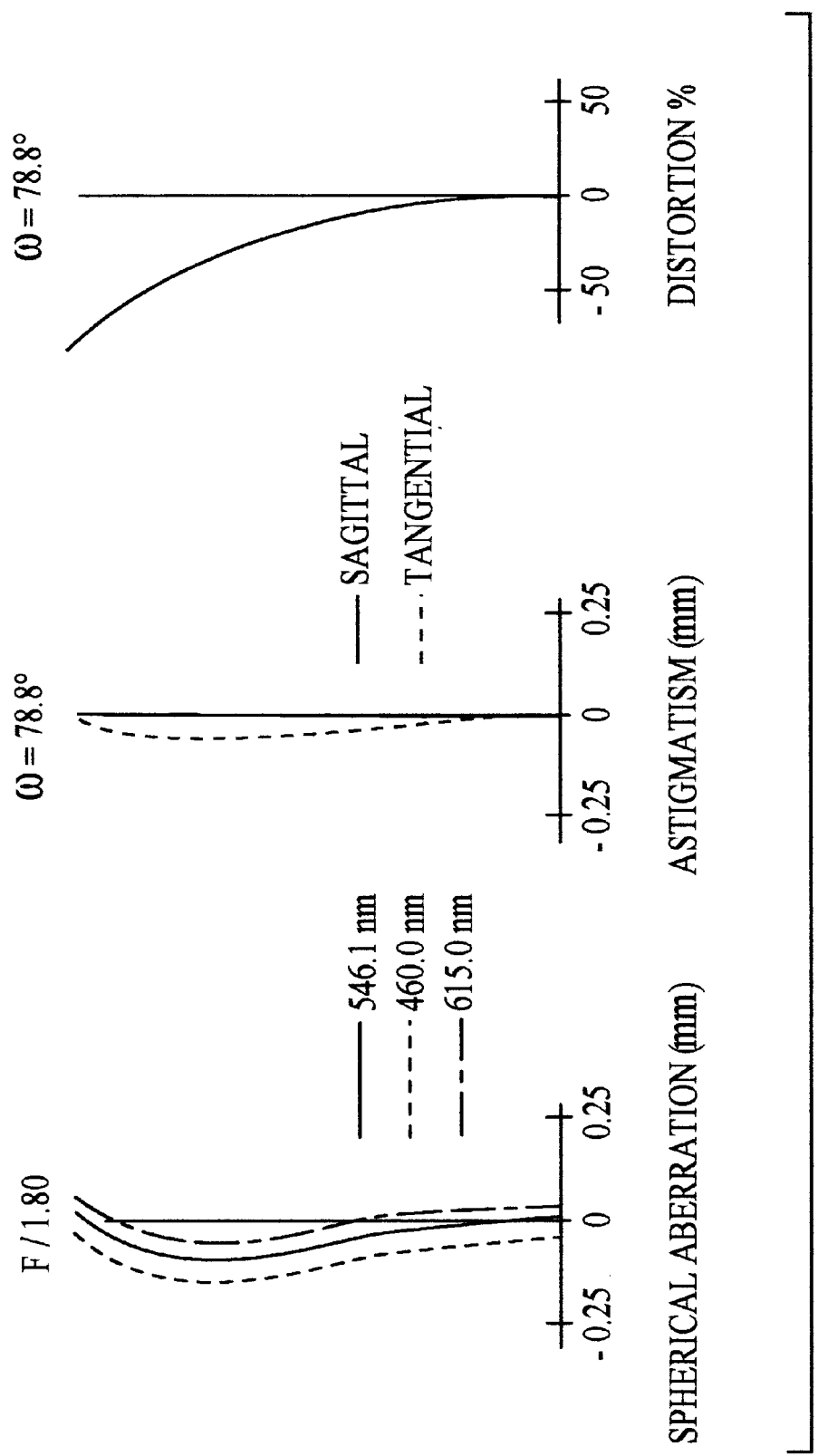
FIG. 12 is a diagram of the spherical aberration, astigmatism, and distortion of the lens of embodiment 6.
Figure 13:
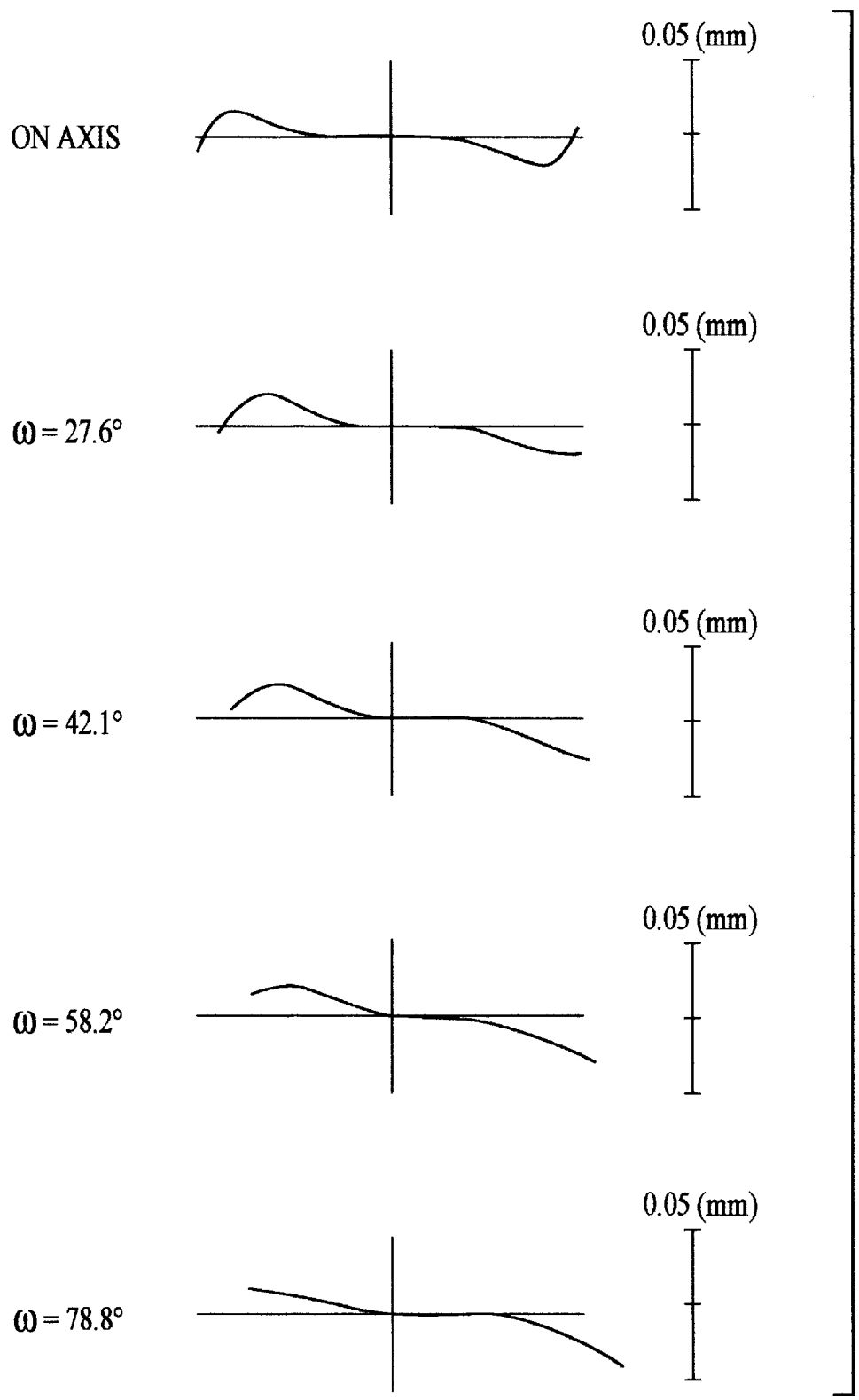
FIG. 13 shows the coma of the lens of embodiment 6.

FIG. 1 shows the basic construction of the lens of the present invention according to embodiments 1–6. As shown in FIG. 1, the image-forming lens relating to these embodiments comprises five lens elements which are arranged, in order from the object side, as follows: a first lens element $L_1$, a second lens element $L_2$, a third lens element $L_3$, a fourth lens element $L_4$, and a fifth lens element $L_5$. Furthermore, a diaphragm i may be arranged at various locations with the lens of the present invention. Thus, luminous flux which is incident along the optical axis X from the object side may be imaged at the image-forming position P on the light receiving surface 2 of the solid state photographic image elements. A low pass filter 1 may also be used with the invention to reduce moire effects.

The first through fifth lens elements $L_1$–$L_5$ possess refractive powers as follows, in order from the object side: negative, negative, positive, positive, and negative, respectively. In addition, construction and arrangement of these lens elements to form the lens of the present invention satisfies the below conditional equation $$3.4 \leq (d_4 + d_5)/f \leq 7.5 \qquad \text{Equation (1)}$$

wherein, $d_4$ is the gap between the second lens element and the third lens element, $d_5$ is the lens thickness of the third lens element, and f is the focal distance of the image-forming lens.

The lens of the present invention, as shown in FIG. 1, is a retro-focus type lens, allowing the back focus to be lengthened while at the same time allowing the half-picture angle ω to be made a relatively wide angle of approximately 80 degrees.

Moreover, based on the structure of the lenses the furthest to the object side consisting of 2 lenses, the spherical aberrations and distortions can be favorably corrected.

In addition, by satisfying the conditional equation (1) above, good correction is accomplished of the spherical aberration, distortion and coma. Furthermore, the back focus can be made longer, and the picture angle made larger, thereby obtaining adequate performance. In other words, if $(d_4+d_5)/f$ exceeds the upper limit of 7.5, then the diameter of the convex lens $L_1$ on the object side becomes all the larger, and the entire body of the lens system also becomes longer, making miniaturization difficult. On the other hand, if $(d_4+d_5)/f$ falls below the lower limit of 3.4, then coma of the lens is not well corrected, or it becomes difficult to design the lens. Either the distortion becomes too large, there is inadequate picture angle, or the back focus becomes short.

In addition, with the present embodiment, the diaphragm position is established rearward from the object side surface of the fourth lens element, and it is possible to suppress the lateral chromatic aberration resulting from the magnified chromatic aberration of the lens. Furthermore, by making the Abbe number $\upsilon_5$ of the fifth lens element $L_5$ be less than 40, the longitudinal chromatic aberration can be well-corrected.

A description is provided hereinafter with regard to embodiments 1–6, utilizing practical numerical values.

Embodiment 1

In embodiment 1, the radius R(in mm) of each lens element surface, the center thickness of each lens element, the distance d (in mm) between each lens element surface, the index of refraction n (for the sodium e spectral line) of each lens element, and the Abbe number $\upsilon$ of each lens element are shown in Table 1 below. (In Tables 1–6 below, the surfaces are numbered in order from the object side.)

TABLE 1

| Surface | R | d | n | $\nu$ |
|---|---|---|---|---|
| 1 | 21.998 | 1.2 | 1.71615 | 53.7 |
| 2 | 4.545 | 1.9 | | |
| 3 | −126.230 | 1.0 | 1.71615 | 53.7 |
| 4 | 3.446 | 5.5 | | |
| 5 | 8.311 | 2.8 | 1.66151 | 50.6 |
| 6 | −18.545 | 2.3 | | |
| 7 | 7.249 | 2.7 | 1.71615 | 53.7 |
| 8 | −4.549 | 0.1 | | |
| 9 | −3.446 | 0.8 | 1.85504 | 23.6 |
| 10 | −5.110 | 0.0 | | |
| 11 | ∞ | 4.5 | 1.51825 | 63.8 |
| 12 | ∞ | | | | f = 1.66 mm   Bf = 4.84 mm   F# = 1.8   $\omega$ = 80.1°   $(d_4 + d_5)/f = 5.00$ Furthermore, in embodiment 1, as shown in the lower section of Table 1, the focal distance f of the image-forming lens is 1.66 mm, the back focus Bf is 4.84 mm, the F# is 1.8, and the half-picture angle $\omega$ is 80.1 degrees. In addition, the value of $(d_4+d_5)/f$ is 5.00, thereby satisfying conditional equation (1) above.

Embodiment 2

In embodiment 2, the radius R(in mm) of each lens element surface, the center thickness of each lens element, the distance d(in mm) between each lens element surface, the index of refraction n (for the sodium e spectral line) of each lens element, and the Abbe number $\upsilon$ of each lens element are shown in Table 2 below.

TABLE 2

| Surface | R | d | n | $\nu$ |
|---|---|---|---|---|
| 1 | 22.518 | 0.8 | 1.90424 | 33.8 |
| 2 | 4.713 | 2.1 | | |
| 3 | 21.181 | 0.8 | 1.50558 | 66.5 |
| 4 | 3.636 | 7.1 | | |
| 5 | 9.091 | 3.4 | 1.51825 | 63.8 |
| 6 | −12.618 | 2.2 | | |
| 7 | 7.429 | 2.3 | 1.80645 | 46.5 |
| 8 | −5.329 | 0.1 | | |
| 9 | −4.358 | 0.8 | 1.85504 | 21.2 |
| 10 | −8.314 | 0.0 | | |
| 11 | ∞ | 4.5 | 1.51825 | 63.8 |
| 12 | ∞ | | | | f = 1.67 mm   Bf = 4.85 mm   F# = 1.8   $\omega$ = 78.7°   $(d_4 + d_5)/f = 6.29$ Furthermore, in embodiment 2, as shown in the lower section of Table 2, the focal distance f of the image-forming lens is 1.67 mm, the back focus Bf is 4.85 mm, the F# is 1.8, and the half-picture angle $\omega$ is 78.7 degrees. In addition, the value of $(d_4+d_5)/f$ becomes 6.29, thereby satisfying conditional equation (1) above.

Embodiment 3

In embodiment 3, the radius R(in mm) of each lens element surface, the center thickness of each lens element, the distance d (in mm) between each lens element surface, the index of refraction n (for the sodium e spectral line) of each lens element, and the Abbe number $\upsilon$ of each lens element are shown in Table 3 below.

TABLE 3

| Surface | R | d | n | $\nu$ |
|---|---|---|---|---|
| 1 | 31.163 | 1.4 | 1.71615 | 53.7 |
| 2 | 4.440 | 2.4 | | |
| 3 | −29.090 | 3.4 | 1.71615 | 53.7 |
| 4 | 3.392 | 2.6 | | |
| 5 | 6.597 | 4.3 | 1.66151 | 50.6 |
| 6 | −11.585 | 2.6 | | |
| 7 | 7.020 | 2.2 | 1.71615 | 53.7 |
| 8 | −4.628 | 0.1 | | |
| 9 | −3.398 | 0.8 | 1.85504 | 23.6 |
| 10 | −4.815 | 0.0 | | |
| 11 | ∞ | 4.5 | 1.51825 | 63.8 |
| 12 | ∞ | | | | f = 1.67 mm   Bf = 4.96 mm   F# = 1.8   $\omega$ = 82.3°   $(d_4 + d_5)/f = 4.13$ Furthermore, in embodiment 3, as shown in the lower section of Table 3, the focal distance f of the image-forming lens is 1.67 mm, the back focus Bf is 4.96 mm, the F# is 1.8, and the half-picture angle $\omega$ is 82.3 degrees. In addition, the value of $(d_4+d_5)/f$ becomes 4.13, thereby satisfying conditional equation (1) above.

Embodiment 4

In embodiment 4, the radius R (in mm)of each lens element surface, the center thickness of each lens element, the distance d(in mm) between each lens element surface, the index of refraction n (for the sodium e spectral line) of each lens element, as well as the Abbe number $\upsilon$ of each lens element are shown in Table 4 below.

TABLE 4

| Surface | R | d | n | ν |
|---|---|---|---|---|
| 1 | 21.419 | 0.8 | 1.73692 | 51.0 |
| 2 | 4.935 | 2.2 | | |
| 3 | 54.415 | 0.8 | 1.73234 | 54.4 |
| 4 | 3.965 | 7.1 | | |
| 5 | 10.020 | 3.5 | 1.50558 | 66.5 |
| 6 | −12.340 | 4.5 | | |
| 7 | 6.078 | 2.5 | 1.67380 | 57.0 |
| 8 | −5.538 | 0.1 | | |
| 9 | −4.211 | 1.0 | 1.63004 | 35.4 |
| 10 | −7.975 | 0.0 | | |
| 11 | ∞ | 4.5 | 1.51825 | 63.8 |
| 12 | ∞ | | | | f = 1.66 mm    Bf = 4.85 mm    F#= 1.8    ω = 79.0°    $(d_4 + d_5)/f = 6.39$

Furthermore, in embodiment 4, as shown in the lower section of Table 4, the focal distance f of the image-forming lens is 1.66 mm, the back focus Bf is 4.85 mm, the F# is 1.8, and the half-picture angle ω is 79.0 degrees. In addition, the value of $(d_4+d_5)/f$ becomes 6.39, thereby satisfying conditional equation (1) above.

Embodiment 5

In embodiment 5, the radius R(in mm) of each lens element surface, the center thickness of each lens element, the distance d(in mm) between each lens element surface, the index of refraction n (for the sodium e spectral line) of each lens element, and the Abbe number ν of each lens element are shown in Table 5 below.

TABLE 5

| Surface | R | d | n | ν |
|---|---|---|---|---|
| 1 | 26.371 | 0.8 | 1.74659 | 49.0 |
| 2 | 4.273 | 1.7 | | |
| 3 | 15.159 | 0.8 | 1.71615 | 53.7 |
| 4 | 3.467 | 7.1 | | |
| 5 | 11.829 | 3.4 | 1.73692 | 51.0 |
| 6 | −10.599 | 2.2 | | |
| 7 | 6.496 | 2.6 | 1.50558 | 66.5 |
| 8 | −4.524 | 0.1 | | |
| 9 | −3.301 | 1.0 | 1.92771 | 21.2 |
| 10 | −4.324 | 0.0 | | |
| 11 | ∞ | 4.5 | 1.51825 | 63.8 |
| 12 | ∞ | | | | f = 1.68 mm    Bf = 4.85 mm    F# = 1.8    ω = 78.8°    $(d_4 + d_5)/f = 6.25$

Futhermore, in embodiment 5, the focal distance f of the image-forming lens is 1.68 mm, the back focus Bf is 4.85 mm, the F# is 1.8, and the half-picture angle ω is 78.8 degrees. In addition, the value of $(d_{4+d5})/f$ becomes 6.25, thereby satisfying conditional equation (1) above.

Embodiment 6

In embodiment 6, the radius R(in mm) of each lens element surface, the center thickness of each lens element, the distance d(in mm) between each lens element surface, the index of refraction n (for the sodium e spectral line) of each lens element, and the Abbe number ν of each lens element are shown in Table 6 below.

TABLE 6

| Surface | R | d | n | ν |
|---|---|---|---|---|
| 1 | 16.123 | 1.1 | 1.83964 | 42.5 |
| 2 | 4.491 | 3.5 | | |
| 3 | −10.325 | 0.9 | 1.56605 | 60.5 |
| 4 | 3.104 | 3.3 | | |
| 5 | 6.556 | 2.8 | 1.69661 | 53.1 |
| 6 | −13.960 | 2.2 | | |
| 7 | 8.606 | 2.0 | 1.80645 | 46.5 |
| 8 | −4.511 | 0.1 | | |
| 9 | −3.382 | 0.8 | 1.92771 | 21.2 |
| 10 | −5.102 | 0.0 | | |
| 11 | ∞ | 4.5 | 1.51825 | 63.8 |
| 12 | ∞ | | | | f = 1.68 mm    Bf = 4.85 mm    F# = 1.8    ω = 78.8°    $(d_4 + d_5)/f = 3.61$

Furthermore, in embodiment 6, as shown in the lower section of table 6, the focal distance f of the image-forming lens is 1.68 mm, the back focus Bf is 4.85 mm, the F# is 1.8, and the half-picture angle ω is 78.8 degrees. In addition, the value of $(d_4+d_5)/f$ becomes 3.61, thereby satisfying conditional equation (1) above.

The spherical aberration, astigmatism, and distortion of embodiments 1–6 are respectably shown in FIGS. 2, 4, 6, 8, 10, and 12. In addition, the coma of embodiments 1–6 is respectively shown in FIGS. 3, 5, 7, 9, 11, and 13. Furthermore, in FIGS. 2–13, ω shows the half-picture angle. As is clear from FIGS. 2–13, according to the present embodiments, each of spherical aberration, astigmatism, and distortion can be corrected.

Furthermore, between the image-forming lens and the light receiving surface of the solid state photographic image elements, there is space for one or more of a low pass filter to prevent moire effects, an infra-red light shielding filter to correct spectral content, or a glass cover to protect the surface of the solid state photographic image elements.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image-forming lens comprising:
   five lens elements, each an individual mass having refractive power and arranged, in order from the object side, as a negative first lens element, a negative second lens element, a positive third lens element, a positive fourth lens element, and a negative fifth lens element;
   said image-forming lens being constructed to satisfy the following conditional equation $3.4 \leq (d_4+d_5)/f \leq 7.5$ wherein,
   $d_4$ is the surface gap between the second lens element and the third lens element,
   $d_5$ is the lens thickness of the third lens element, and
   f is the focal distance of the image-forming lens.

2. The image-forming lens as set forth in claim 1, and further comprising: a diaphragm positioned more toward the image side than the object side surface of the fourth lens element.

3. The image-forming lens as set forth in claim 1, wherein the Abbe number $ν_5$ of the fifth lens element is less than or equal to 40.

4. The image-forming lens of claim 1, and further comprising said image-forming lens having the following construction parameters, in order from the object side:

| Surface | R | d | n | ν |
|---|---|---|---|---|
| 1 | 21.998 | 1.2 | 1.71615 | 53.7 |
| 2 | 4.545 | 1.9 | | |
| 3 | −126.230 | 1.0 | 1.71615 | 53.7 |
| 4 | 3.446 | 5.5 | | |
| 5 | 8.311 | 2.8 | 1.66151 | 50.6 |
| 6 | −18.545 | 2.3 | | |
| 7 | 7.249 | 2.7 | 1.71615 | 53.7 |
| 8 | −4.549 | 0.1 | | |
| 9 | −3.446 | 0.8 | 1.85504 | 23.6 |
| 10 | −5.110 | 0.0 | | |
| 11 | ∞ | 4.5 | 1.51825 | 63.8 |
| 12 | ∞ | | | | where R is the radius of curvature (in mm) of each lens element surface, d is the spacing (in mm) between each lens element surface, n is the index of refraction for the sodium e line of each lens element, and υ is the Abbe number of each lens element.

5. The image-forming lens of claim 1, and further comprising said image-forming lens having the following construction parameters, in order from the object side:

| Surface | R | d | n | ν |
|---|---|---|---|---|
| 1 | 22.518 | 0.8 | 1.90424 | 33.8 |
| 2 | 4.713 | 2.1 | | |
| 3 | 21.181 | 0.8 | 1.50558 | 66.5 |
| 4 | 3.636 | 7.1 | | |
| 5 | 9.091 | 3.4 | 1.51825 | 63.8 |
| 6 | −12.618 | 2.2 | | |
| 7 | 7.429 | 2.3 | 1.80645 | 46.5 |
| 8 | −5.329 | 0.1 | | |
| 9 | −4.358 | 0.8 | 1.85504 | 21.2 |
| 10 | −8.314 | 0.0 | | |
| 11 | ∞ | 4.5 | 1.51825 | 63.8 |
| 12 | ∞ | | | | where R is the radius of curvature (in mm) of each lens element surface, d is the spacing (in mm) between each lens element surface, n is the index of refraction for the sodium e line of each lens element, and υ is the Abbe number of each lens element.

6. The image-forming lens of claim 1, and further comprising said image-forming lens having the following construction parameters:

| Surface | R | d | n | ν |
|---|---|---|---|---|
| 1 | 31.163 | 1.4 | 1.71615 | 53.7 |
| 2 | 4.440 | 2.4 | | |
| 3 | −29.090 | 3.4 | 1.71615 | 53.7 |
| 4 | 3.392 | 2.6 | | |
| 5 | 6.597 | 4.3 | 1.66151 | 50.6 |
| 6 | −11.585 | 2.6 | | |
| 7 | 7.020 | 2.2 | 1.71615 | 53.7 |
| 8 | −4.628 | 0.1 | | |
| 9 | −3.398 | 0.8 | 1.85504 | 23.6 |
| 10 | −4.815 | 0.0 | | |
| 11 | ∞ | 4.5 | 1.51825 | 63.8 |
| 12 | ∞ | | | | where R is the radius of curvature (in mm) of each lens element surface, d is the spacing (in mm) between each lens element surface, n is the index of refraction for the sodium e line of each lens element, and υ is the Abbe number of each lens element.

7. The image-forming lens of claim 1, and further comprising said image-forming lens having the following construction parameters:

| Surface | R | d | n | ν |
|---|---|---|---|---|
| 1 | 21.419 | 0.8 | 1.73692 | 51.0 |
| 2 | 4.935 | 2.2 | | |
| 3 | 54.415 | 0.8 | 1.73234 | 54.4 |
| 4 | 3.965 | 7.1 | | |
| 5 | 10.020 | 3.5 | 1.50558 | 66.5 |
| 6 | −12.340 | 4.5 | | |
| 7 | 6.078 | 2.5 | 1.67380 | 57.0 |
| 8 | −5.538 | 0.1 | | |
| 9 | −4.211 | 1.0 | 1.63004 | 35.4 |
| 10 | −7.975 | 0.0 | | |
| 11 | ∞ | 4.5 | 1.51825 | 63.8 |
| 12 | ∞ | | | | where R is the radius of curvature (in mm) of each lens element surface, d is the spacing (in mm) between each lens element surface, n is the index of refraction for the sodium e line of each lens element, and υ is the Abbe number of each lens element.

8. The image-forming lens of claim 1, and further comprising said image-forming lens having the following construction parameters:

| Surface | R | d | n | ν |
|---|---|---|---|---|
| 1 | 26.371 | 0.8 | 1.74659 | 49.0 |
| 2 | 4.273 | 1.7 | | |
| 3 | 15.159 | 0.8 | 1.71615 | 53.7 |
| 4 | 3.467 | 7.1 | | |
| 5 | 11.829 | 3.4 | 1.73692 | 51.0 |
| 6 | −10.599 | 2.2 | | |
| 7 | 6.496 | 2.6 | 1.50558 | 66.5 |
| 8 | −4.524 | 0.1 | | |
| 9 | −3.301 | 1.0 | 1.92771 | 21.2 |
| 10 | −4.324 | 0.0 | | |
| 11 | ∞ | 4.5 | 1.51825 | 63.8 |
| 12 | ∞ | | | | where R is the radius of curvature (in mm) of each lens element surface, d is the spacing (in mm) between each lens element surface, n is the index of refraction for the sodium e line of each lens element, and υ is the Abbe number of each lens element.

9. The image-forming lens of claim 1, and further comprising said image-forming lens having the following construction parameters:

| Surface | R | d | n | ν |
|---|---|---|---|---|
| 1 | 16.123 | 1.1 | 1.83964 | 42.5 |
| 2 | 4.491 | 3.5 | | |
| 3 | −10.325 | 0.9 | 1.56605 | 60.5 |
| 4 | 3.104 | 3.3 | | |
| 5 | 6.556 | 2.8 | 1.69661 | 53.1 |
| 6 | −13.960 | 2.2 | | |
| 7 | 8.606 | 2.0 | 1.80645 | 46.5 |
| 8 | −4.511 | 0.1 | | |
| 9 | −3.382 | 0.8 | 1.92771 | 21.2 |
| 10 | −5.102 | 0.0 | | |
| 11 | ∞ | 4.5 | 1.51825 | 63.8 |
| 12 | ∞ | | | | where R is the radius of curvature (in mm) of each lens element surface, d is the spacing (in mm) between each lens element surface, n is the index of refraction for the sodium e line of each lens element, and υ is the Abbe number of each lens element.

* * * * *